(12) United States Patent
Xie et al.

(10) Patent No.: US 9,364,782 B1
(45) Date of Patent: Jun. 14, 2016

(54) SEPARATION OF GASES USING GME FRAMEWORK TYPE ZEOLITES

(71) Applicants: Dan Xie, Richmond, CA (US); Howard Steven Lacheen, Richmond, CA (US)

(72) Inventors: Dan Xie, Richmond, CA (US); Howard Steven Lacheen, Richmond, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 14/605,557

(22) Filed: Jan. 26, 2015

(51) Int. Cl.
*B01D 53/02* (2006.01)
*B01D 53/04* (2006.01)
*B01D 53/22* (2006.01)
*B01D 71/02* (2006.01)
*C10L 3/10* (2006.01)
*B01D 53/047* (2006.01)

(52) U.S. Cl.
CPC .............. *B01D 53/02* (2013.01); *B01D 53/047* (2013.01); *B01D 53/0462* (2013.01); *B01D 53/228* (2013.01); *B01D 71/028* (2013.01); *C10L 3/104* (2013.01); *B01D 2253/1085* (2013.01); *B01D 2257/504* (2013.01); *C10L 2290/542* (2013.01)

(58) Field of Classification Search
CPC ...... B01D 53/02; B01D 53/04; B01D 53/047; B01D 53/062; B01D 53/22; B01D 53/228; B01D 71/028; B01D 2253/1085; B01D 2257/504; B01D 53/0462; C01B 39/02; C10L 3/104
See application file for complete search history.

(56) References Cited

U.S. PATENT DOCUMENTS

| | | | | |
|---|---|---|---|---|
| 3,660,967 A | * | 5/1972 | Collins | B01D 53/02 95/137 |
| 3,788,036 A | * | 1/1974 | Lee | B01D 53/053 96/130 |
| 4,061,717 A | * | 12/1977 | Kerr | B01J 29/06 423/702 |
| 5,616,170 A | | 4/1997 | Ojo et al. | |
| 6,187,283 B1 | * | 2/2001 | Chiyoda | C01B 39/02 423/700 |
| 6,197,427 B1 | * | 3/2001 | Anstett | B01D 71/028 210/490 |
| 6,238,460 B1 | * | 5/2001 | Deng | B01D 53/02 95/102 |
| 6,436,173 B1 | * | 8/2002 | Jale | B01D 53/02 95/130 |
| 6,436,364 B1 | | 8/2002 | Chiyoda et al. | |
| 6,551,573 B2 | | 4/2003 | Huo | |
| 2002/0076376 A1 | * | 6/2002 | Huo | C01B 39/02 423/702 |
| 2003/0084786 A1 | * | 5/2003 | Chau | B01D 71/028 95/45 |
| 2003/0131731 A1 | * | 7/2003 | Koros | B01D 53/22 96/10 |
| 2012/0060686 A1 | * | 3/2012 | Kortunov | B01D 53/1475 95/26 |

OTHER PUBLICATIONS

G.T. Kokotailo and S.L. Lawton Possible Structures Related to Gmelinite Nature 1964, 203, 621-623.
R.H. Daniels, G.T. Kerr and L.D. Rollmann "Cationic Polymers as Templates in Zeolite Crystallization" J. Am. Chem. Soc. 1978, 100, 3097-3100.
O. Chiyoda and M.E. Davis "Hydrothermal conversion of Y-zeolite using alkaline-earth cations" Micropor. Mesopor. Mater. 1999, 32, 257-264.

* cited by examiner

Primary Examiner — Jason M Greene
(74) Attorney, Agent, or Firm — Terrance M. Flaherty

(57) ABSTRACT

The present disclosure relates to the selective separation of carbon dioxide ($CO_2$) from multi-component gas feedstreams containing $CO_2$ utilizing a GME framework type zeolite substantially free of non-GME framework type material.

8 Claims, 2 Drawing Sheets

US 9,364,782 B1

SEPARATION OF GASES USING GME FRAMEWORK TYPE ZEOLITES

TECHNICAL FIELD

The present disclosure relates to the selective separation of carbon dioxide from multi-component gas streams containing carbon dioxide utilizing GME framework type zeolites substantially free of non-GME framework type material.

BACKGROUND

Removal of contaminants or impurities from a gas phase stream is a commonly encountered process in petroleum and natural gas processing. For example, many natural gas streams contain at least some carbon dioxide ($CO_2$) in addition to the desired methane ($CH_4$). Additionally, many refinery processes generate a gas phase output that includes a variety of species, such as $CH_4$ and $CO_2$, which are gases at standard temperature and pressure. Performing a separation on a gas phase stream containing $CH_4$ can allow for removal of an impurity and/or diluent such as $CO_2$ or nitrogen ($N_2$) under controlled conditions. Such an impurity or diluent can then be directed to other processes, such as being directed to another use that reduces the loss of greenhouse gases to the environment. Accordingly, there is a continuing need for efficient processes and materials for selectively separating constituent gases from a stream of gases Molecular sieve materials, both natural and synthetic, have been demonstrated in the past to be useful as adsorbents and to have catalytic properties for various types of hydrocarbon conversion reactions. Certain molecular sieves, such as zeolites, aluminophosphates, and mesoporous materials, are ordered, porous crystalline materials having a definite crystalline structure as determined by X-ray diffraction (XRD). Within the crystalline molecular sieve material there are a large number of cavities which may be interconnected by a number of channels or pores. These cavities and pores are uniform in size within a specific molecular sieve material. Because the dimensions of these pores are such as to accept for adsorption molecules of certain dimensions while rejecting those of larger dimensions, these materials have come to be known as "molecular sieves" and are utilized in a variety of industrial processes.

Molecular sieves are classified by the Structure Commission of the International Zeolite Association according to the rules of the IUPAC Commission on Zeolite Nomenclature. According to this classification, framework-type zeolites and other crystalline microporous molecular sieves, for which a structure has been established, are assigned a three letter code and are described in the "*Atlas of Zeolite Framework Types,*" Sixth Revised Edition, Elsevier, 2007.

Zeolitic materials of the GME framework type are characterized by a three-dimensional channel system composed of 12-membered ring channels interconnected at right angles by a two-dimensional system of 8-membered ring channels. Gmelinite is a naturally occurring sodium-calcium zeolite of the GME framework type and has a typical composition of $8Na_2O:4CaO:Al_2O_3:4SiO_2:6H_2O$.

U.S. Pat. No. 4,061,717 reports the preparation of fault-free gmelinite using quaternary ammonium polymers as a structure directing agent.

U.S. Pat. No. 6,187,283 discloses the organotemplate-free hydrothermal conversion of low $SiO_2/Al_2O_3$ mole ratio (SAR) Y-zeolite (FAU framework type, SAR=4.0-4.8) to gmelinite with strontium cations, under crystallization conditions including a temperature of 240° C. and a time of 14 days. Hydrothermal conversion of Y-zeolite with inorganic cations other than strontium produced materials other than synthetic gmelinite.

Conventional natural and synthetic gemlinite have a propensity to intergrow with chabazite or related zeolites, resulting in blockage of the 12-membered ring channel of the gmelinite structure and poor sorption properties resulting from a variety of possible intergrowths.

It has now been found that GME framework type zeolites substantially free of non-GME framework type material can be synthesized by organotemplate-free hydrothermal conversion of FAU framework type zeolites with sodium cations, under mild crystallization conditions.

The GME framework type zeolites disclosed herein can be suitable for selectively separating carbon dioxide ($CO_2$) from multi-component gas feedstreams containing $CO_2$ and at least one other gas component.

SUMMARY

In one aspect, there is provided a process for selectively separating carbon dioxide ($CO_2$) from a multi-component gas feedstream comprising $CO_2$ and at least one other gas component, the process comprising: (a) contacting the feedstream with an adsorbent comprising a GME framework type zeolite substantially free of non-GME framework type material; and (b) adsorbing at least a portion of the $CO_2$ in the adsorbent, thereby producing a $CO_2$-lean product gas stream, wherein the $CO_2$-lean product gas stream has a lower concentration of $CO_2$ than the feedstream.

In another aspect, there is provided a process for selectively separating carbon dioxide ($CO_2$) from a multi-component gas feedstream comprising $CO_2$ and at least one other gas component, the process comprising: contacting a first side of a membrane comprising a GME framework type zeolite substantially free of non-GME framework type material to produce a permeate gas mixture on a second side of the membrane and a retentate gas mixture on the first side of the membrane, wherein the permeate gas mixture has a higher concentration of $CO_2$ than the feedstream and the retentate gas mixture has a lower concentration of $CO_2$ than the feedstream.

DETAILED DESCRIPTION

Introduction

Figure 1:
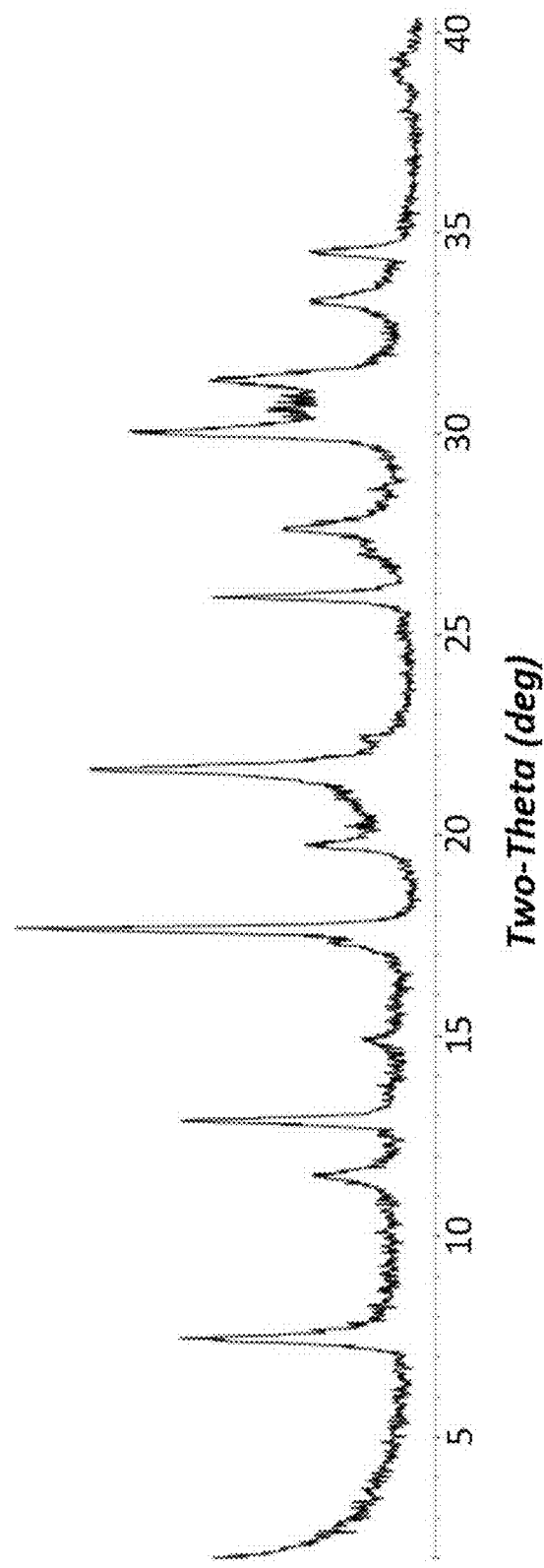
FIG. 1 is a powder XRD pattern of the zeolite prepared in Example 1.

The following terms will be used throughout the specification and will have the following meanings unless otherwise indicated.

The term "zeolite" refers to crystalline aluminosilicate compositions which are microporous and which are formed from corner sharing $AlO_2$ and $SiO_2$ tetrahedra.

The term "framework type" is used in the sense described in the "*Atlas of Zeolite Framework Types,*" Sixth Revised Edition, Elsevier, 2007.

Synthesis of the GME Framework Type Zeolite

In general, the GME framework type zeolite disclosed herein is prepared by: (a) preparing an organotemplate-free reaction mixture containing (1) a FAU framework type zeolite; (2) at least one source of sodium ions; (3) hydroxide ions;

and (4) water; and (b) subjecting the reaction mixture to crystallization conditions sufficient to form crystals of the GME framework zeolite.

Examples of FAU framework type zeolites include faujasite, zeolite X, zeolite Y, and LZ-210. The FAU framework type zeolite can have a $SiO_2/Al_2O_3$ mole ratio of at least 5 (e.g., from 5 to 100, from 5 to 80, from 5 to 60, from 5 to 30, from 10 to 100, from 10 to 80, from 10 to 60, from 10 to 30, from 12 to 100, from 12 to 80, from 12 to 60, or from 12 to 30).

The composition of the organotemplate-free reaction mixture from which the GME framework type zeolite is formed, in terms of mole ratios, is identified in Table 1 below:

TABLE 1

| | Broad | Exemplary |
|---|---|---|
| $SiO_2/Al_2O_3$ | 5 to 100 | 10 to 60 |
| $Na/SiO_2$ | 0.10 to 1.5 | 0.50 to 1.0 |
| $OH/SiO_2$ | 0.10 to 1.5 | 0.50 to 1.0 |
| $H_2O/SiO_2$ | 2 to 100 | 4 to 40 |

Sources of silicon in addition to the FAU framework type zeolite include fumed silica, precipitated silicates, silica hydrogel, silicic acid, colloidal silica, tetra-alkyl orthosilicates (e.g., tetraethyl orthosilicate), and silica hydroxides.

Sources of aluminum in addition to the FAU framework type zeolite include alumina, aluminum hydroxide, alkali metal aluminates, aluminum alkoxides, and water-soluble aluminum salts, such as aluminum nitrate.

Sources of sodium include oxides, hydroxides, nitrates, sulfates, halides, acetates, oxalates, and citrates thereof.

One feature of the process disclosed herein is that the reaction mixture is substantially free of strontium cations. The term "substantially free of strontium cations" as employed herein means that strontium cations are completely absent from the reaction mixture or are present in quantities that have less than a measureable effect on, or confer less than a material advantage to, the synthesis of the GME framework type described herein (e.g., $Sr^{2+}$ is present in the reaction mixture as an impurity of one or more of the reactants, for example, in an amount of 0.001 wt. % or less, preferably 0.00001 wt. % or less).

Optionally the reaction mixture can contain seed crystals. It is well known that seeding a zeolite synthesis mixture frequently has beneficial effects, for example in controlling the particle size of the product, avoiding the need for an organic template, accelerating synthesis, and improving the proportion of product that is of the intended framework type. When used, seed crystals are added in an amount such that the weight ratio of seeds/$SiO_2$ in the reaction mixture can be from 0.001 to 0.3, e.g., from 0.01 to 0.08, or from 0.01 to 0.05.

Another feature of the process disclosed herein is that the reaction mixture is organotemplate-free. This is beneficial both from a cost and an environmental standpoint, since there is no need to use or dispose of conventionally used organic structure directing agents such as amines or alkylammonium compounds.

The phrase "organotemplate-free" as employed herein means that organic structure directing agents are completely absent from the reaction mixture or are present in an amount that have less than a measurable effect on, or confer less than a material advantage to, the synthesis of the GME framework type zeolites described herein (e.g., an organic structure directing agent is present in the reaction mixture as an impurity, for example, in an amount of 0.1 wt. % or less, preferably 0.01 wt. % or less, more preferably 0.001 wt. % or less).

Furthermore, it is noted that the terms "organotemplate" and "organic structure directing agent" are synonymously used in the present disclosure.

The term "organotemplate" as employed in the present application designates any conceivable organic material which is suitable for template-mediated synthesis of a zeolite material, preferably of a zeolite material having a GME framework type structure. Such organotemplates include, e.g., quaternary ammonium polymers as described in U.S. Pat. No. 4,061,717.

For each embodiment described herein, the reaction mixture can be supplied by more than one source. Also, two or more reaction components can be provided by one source.

The reaction mixture can be prepared either batch wise or continuously. Crystal size, morphology and crystallization time of the GME framework type zeolite described herein can vary with the nature of the reaction mixture and the crystallization conditions.

Crystallization and Post-Synthesis Treatment of the GME Framework Type Zeolite

In practice, the GME framework type zeolite is synthesized by: (a) preparing an organotemplate-free reaction mixture as described herein above; and (b) subjecting the reaction mixture to hydrothermal crystallization conditions sufficient to form crystals of the GME framework type zeolite.

The reaction mixture is maintained at an elevated temperature until the crystals of the GME framework zeolite are formed. The hydrothermal crystallization is usually conducted under pressure and usually in an autoclave so that the reaction mixture is subject to autogenous pressure, at a temperature of from 120° C. to 200° C., e.g., from 120° C. to 180° C., or from 120° C. to 150° C.

Once the GME framework type zeolite crystals have formed, the solid product is separated from the reaction mixture by standard mechanical techniques such as filtration. The recovered crystals are water-washed and then dried. The drying step can be performed at atmospheric pressure or under vacuum. At this stage, the recovered crystalline GME framework type zeolite is in the non-calcined state and is free of organic structure directing agent.

The zeolite crystallized in step (b) can optionally be subject to at least one step of an ion-exchange procedure, wherein the term "ion-exchange" as used herein generally refers to non-framework ionic elements and/or molecules contained in the zeolite. In general, any conceivable ion-exchange procedure with all possible ionic elements and/or molecules can be conducted on the zeolite, with the exception of organic structure directing agents specifically used in the synthesis of zeolites having the GME framework type.

In the process of the present disclosure, it is preferred that a calcination step is not employed. In general, a calcination step involves the heating of the crystallized zeolite according to step (b) above a temperature of 500° C. More preferably, a process according to the present disclosure for the production of a GME framework type zeolite which does not comprise a calcination step refers to processes wherein the zeolitic material crystallized according to step (b) is not subject in a subsequent step to a temperature exceeding 450° C., more preferably 350° C., more preferably 300° C., more preferably 250° C., more preferably 200° C., and even more preferably 150° C. According to the present disclosure, it is particularly preferred that after completion of step (b) of the process disclosed herein, wherein the crystallized zeolite is at ambient temperature, the material is subsequently not subject to any heating process normally or suitably conducted for removal of organotemplates from a zeolite having a GME framework type structure. Within the meaning of the present disclosure, a zeolite which is "non-calcined" is one which has not been subject to any one of the aforementioned calcination procedures.

GME framework type zeolites made by the process described herein have a composition, in the non-calcined and anhydrous state, in terms of mole ratios, as follows:

$$xNa_2O:Al_2O_3:ySiO_2$$

wherein $0<x\leq1$; and y has a value from 3 to 8.

The zeolite disclosed herein can be composited with other materials resistant to the temperatures and other conditions employed in adsorption processes. For example, the zeolite disclosed herein can be composited with a binder selected from inorganic materials such as clays, oxides of aluminum, magnesium, silicon, titanium, zirconium, and mixtures thereof. The zeolite can be bound by forming a pill, sphere, or extrudate. The amount of zeolite in the final bound product can range from 50 to 95 wt. % (e.g., from 60 to 90 wt. %), based on the total weight of the product.

Characterization of the GME Framework Type Zeolite

The GME framework type zeolites synthesized by the process described herein are characterized by their X-ray diffraction pattern. X-ray diffraction patterns representative of GME framework type zeolites can be referenced in the "*Collection of Simulated XRD Powder Patterns for Zeolites*," Fifth Revised Edition, Elsevier, 2007. Minor variations in the diffraction pattern can result from variations in the mole ratios of the framework species of the particular sample due to changes in lattice constants. In addition, sufficiently small crystals will affect the shape and intensity of peaks, leading to significant peak broadening. Minor variations in the diffraction pattern can result from variations in the organic compound used in the preparation. Calcination can also cause minor shifts in the X-ray diffraction pattern. Notwithstanding these minor pertubations, the basic crystal structure remains unchanged.

The powder X-ray diffraction patterns presented herein were collected by standard techniques. The radiation was CuK$_\alpha$ radiation. The peak heights and the positions, as a function of 2θ where θ is the Bragg angle, were read from the relative intensities of the peaks, and d, the interplanar spacing corresponding to the recorded lines, can be calculated.

The crystalline GME framework type zeolite prepared in accordance with this disclosure is preferably substantially free of non-GME framework type material. By "substantially free of non-GME framework type material" is meant that the composition does not contain non-GME framework type phases, as measured by X-ray diffraction. The presence of these impurities can be determined and quantified by analysis of the X-ray diffraction pattern of a sample. The term "non-GME framework type material" used herein means any material that does not contain crystalline molecular sieve of the GME framework type. Examples of such non-GME framework material include amorphous material, analcime (ANA framework type), chabazite (CHA framework type), and Y and X zeolites (FAU framework type). The non-GME framework type material can co-crystallize with the GME framework type material or mix with the GME framework type material.

Gas Separation with the GME Framework Type Zeolite

The GME framework type zeolite disclosed herein can be used as adsorbents for the separation of gaseous mixtures giving high selectivities. The GME framework type zeolites disclosed herein can be applicable to membrane as well as swing adsorption processes. Membranes can be formed from adsorbent materials. For example, hydrothermal synthesis processes can produce zeolite membranes. Zeolites can also be incorporated into mixed matrix membranes.

In a membrane separation process, a first side of a membrane is contacted with a multi-component gas feedstream to produce a permeate gas mixture on a second side of the membrane and a retentate gas mixture on the first side of the membrane. The permeate gas mixture has a higher concentration (in terms of mole %, wt. %, or vol. % as defined by the process) of a select component (i.e., $CO_2$) than the multi-component gas feedstream stream that initially contacts the membrane. The retentate gas mixture has a lower concentration (in terms of mole %, wt. %, or vol. % as defined by the process) of a select component (i.e., $CO_2$) than the multi-component gas feedstream stream that initially contacts the membrane.

The membrane may take any form known in the art, for example, hollow fibers, tubular shapes, and other membrane shapes. Some other membrane shapes include spiral wound, pleated, flat sheet, or polygonal tubes. Multiple hollow fiber membrane tubes can be preferred for their relatively large fluid contact area. The contact area may be further increased by adding additional tubes or tube contours, Contact may also be increased by altering the gaseous flow by increasing fluid turbulences or swirling.

All swing adsorption process have an adsorption step in which a multi-component gas feedstream is flowed over an adsorbent that preferentially adsorbs a more readily adsorbed component. A component may be more readily adsorbed because of kinetic or equilibrium properties of the adsorbent.

The method of adsorbent regeneration designates the type of swing adsorption process. Pressure Swing Adsorption (PSA) processes rely on the fact that gases under pressure tend to be adsorbed within the pore structure of the microporous adsorbent materials. Typically, the higher pressure, the greater the amount of targeted gas component will be adsorbed. When the pressure is reduced, the adsorbed targeted component is typically released, or desorbed. PSA processes can be used to separate gases of a gas mixture because different gases tend to fill the micropore or free volume of the adsorbent to different extents due to either the kinetic or equilibrium properties of the adsorbent.

Temperature Swing Adsorption (TSA) processes also rely on the fact that gases under pressure tend to be adsorbed within the pore structure of the microporous adsorbent materials. When the temperature of the adsorbent is increased, the adsorbed gas is typically released, or desorbed. By cyclically swinging the temperature of the adsorbent beds, TSA processes can be used to separate gases in a mixture when used with an adsorbent selective for one or more of the components in a gas mixture.

In a swing adsorption process, there is at least one adsorption step wherein a multi-component gas feedstream is contacted with the adsorbent material. During this step of the process, the multi-component gas feedstream contacts the adsorbent material under certain process temperature and pressure conditions and as the multi-component gas feedstream flows through the adsorbent material at least a portion of the "first component" (i.e., $CO_2$) of the multi-component gas stream is preferentially adsorbed by the adsorbent material with respect to a "second component" (e.g., $CH_4$ or $N_2$). During this step an "effluent stream" (or "$CO_2$-lean product stream" herein) is drawn from the swing adsorption process wherein the concentration (in terms of mole %, wt. %, or vol. % as defined by the process) of the first component into the swing adsorption process is higher than the concentration of the first component out of the swing adsorption process during this adsorption step. Although it is not necessary, it is preferred that the concentration of the first component in the multi-component gas stream be greater than the concentration of the first component in the effluent stream.

The effluent stream (or "$CO_2$-lean product stream") that is obtained can have a $CO_2$ content of less than 5 vol. %, e.g., less than 2 vol. %.

The swing adsorption process is typically also comprised of at least one desorption step wherein at least a portion of the first component that has been preferentially adsorbed by the adsorbent material is recovered in what is termed herein as a "desorbed stream" (or "$CO_2$-rich product stream" herein). During this step, the process conditions in the swing adsorption process are changed to allow at least a portion of the first component (i.e., $CO_2$) to be desorbed from the adsorbent material and collected as a "desorbed stream". This desorption can be induced by a pressure swing, a temperature swing, the introduction of a partial pressure purge displacement stream, or a combination thereof. In a preferred embodiment, the concentration of the first component in the desorbed stream is greater than the concentration of the first component in the multi-component gas feedstream. In another preferred embodiment, the concentration of the first component in the desorbed stream is greater than the concentration of the first component in the effluent stream.

The $CO_2$-rich product stream that is produced can have a $CO_2$ content of at least 50 vol. % (e.g., at least 60 vol. %, at least 70 vol. %, at least 80 vol. %, or at least 90 vol. %). It is preferred that the concentration of $CO_2$ in the $CO_2$-rich stream product stream be greater than the concentration of $CO_2$ in the multi-component gas feedstream containing $CO_2$.

One embodiment of the swing adsorption process of the present disclosure utilizes a PSA process wherein the adsorbent material is comprised of a GME framework type zeolite and the "first component" as described above is $CO_2$ and the "second component" as described above is $CH_4$. In another embodiment, the "first component" as described above is $CO_2$ and the "second component" as described above is $N_2$. In this PSA process, the partial pressure of the first component in the adsorption step is higher than the partial pressure of the first component in the desorption step which allows at least a portion of the adsorbed first component to be recovered in the desorption step and the adsorbent material to be regenerated by depletion of the adsorbed components for reuse in a subsequent adsorption step. This is accomplished in part by exposing the adsorbent material to lower partial pressure conditions in the desorption step than the partial pressure conditions in the adsorption step. This desorption can be further assisted by utilizing a purge gas to lower the partial pressure of the first component during the desorption step, a purge step, a partial pressurization step, or a partial depressurization step.

Another type of swing adsorption process of the present disclosure is a TSA process wherein the adsorbent material is comprised of a GME framework type zeolite and the "first component" as described above is $CO_2$ and the "second component" as described above is $CH_4$. In another embodiment, the "first component" as described above is $CO_2$ and the "second component" as described above is $N_2$. The TSA processes operate similar to the PSA processes above wherein the partial pressure of the first component in the adsorption step is higher than the partial pressure of the first component in the desorption step which allows at least a portion of the adsorbed first component to be recovered in the desorption step and the adsorbent material to be regenerated by depletion of the adsorbed components for reuse in a subsequent adsorption step. However, in the TSA processes, this is accomplished in part by exposing the adsorbent material to higher temperature conditions in the desorption step than the temperature conditions in the adsorption step. This desorption can be further assisted by utilizing a purge gas to lower the partial pressure of the first component and/or provide heating of the adsorbent material during the desorption step, a purge step, a partial pressurization step, or a partial depressurization step.

The GME framework type zeolite utilized in a swing adsorption process can have a $CO_2/CH_4$ selectivity at the operating conditions in the sorption steps of at least 5, e.g., at least 10, at least 15, at least 20, at least 25, at least 30, at least 50, at least 75, at least 100, at least 200, at least 300, at least 400, or at least 500. Additionally or alternately, the GME framework type zeolite utilized in a swing adsorption process can have a $CO_2/CH_4$ selectivity at the operating conditions in the sorption steps of up to 10000, e.g., up to 7500, up to 5000, up to 2500, up to 1000, up to 500, up to 250, up to 200, up to 100, up to 75, up to 50, up to 30, up to 25, up to 20, up to 15, or up to 10.

The GME framework type zeolite utilized in a swing adsorption process can have a $CO_2/N_2$ selectivity at the operating conditions in the sorption steps of at least 5, e.g., at least 10, at least 15, at least 20, at least 25, at least 30, at least 50, at least 75, at least 100, at least 200, at least 300, at least 400, or at least 500. Additionally or alternately, the GME framework type zeolite utilized in a swing adsorption process can have a $CO_2/N_2$ selectivity at the operating conditions in the sorption steps of up to 10000, e.g., up to 7500, up to 5000, up to 2500, up to 1000, up to 500, up to 250, up to 200, up to 100, up to 75, up to 50, up to 30, up to 25, up to 20, up to 15, or up to 10.

When the term "selectivity" is used herein with respect to the propensity of a sorbent to favor sorption of a desired component (in this case, typically $CO_2$) over an undesired component, it should be understood that such "selectivity" is based on approximately an equilibrium sorption process with the sorbent, and not on a kinetic sorption process. That means that selectivities described herein represent competitive sorption between desired and undesired components on a time scale that is long enough to approximate equilibrium—whether such a sufficiently long time scale may be on the order of portions of seconds or multiple hours (or anywhere in between) should not be particularly relevant.

It should also be noted that the steps of the PSA and TSA processes can be combined in a PSA/TSA process. In these combined processes, both pressure and temperature changes or "swings" are made between the adsorption steps and desorption steps of the process, resulting in a desired separation of at least a portion of the first component from the second component of the multi-component gas feedstream fed to the inlet of the PSA/TSA process.

Gas Feedsteam

The separation methods described herein can be used to perform separations on a variety of multi-component gas feedstreams. The feedstream can be a natural gas, a flue gas or an organically derived gas stream selected from a landfill produced gas and a biogenically produced gas.

A "natural gas" refers to a multi-component gas obtained from a crude oil or gas condensate well (termed associated gas) or from a subterranean gas-bearing formation (termed non-associated gas). The composition and pressure of natural gas can vary significantly. A typical natural gas stream contains $CH_4$ as a significant component. Raw natural gas will also typically contain ethane ($C_2H_6$), other hydrocarbons, one or more acid gases such as $CO_2$, hydrogen disulfide ($H_2S$), carbonyl sulfide (COS), carbon disulfide ($CS_2$), and mercaptans, and minor amounts of contaminants such as water, nitrogen, iron sulfide, wax, and crude oil.

A major need in the current industry is for effective gas phase processes for the separation of $CO_2$ from $CH_4$ in the recovery and production of natural gas from gas fields. While $CH_4$ is a valuable hydrocarbon component for natural gas, almost all natural gas fields contain some level of $CO_2$ in the gas stream. Although the composition of the streams will vary from field to field, many of these natural gas field streams contain a large amount of $CO_2$, typically in concentrations greater than about 10 vol. %. In some instances these natural gas field streams can have a $CO_2$ content greater than about 25 vol. %, e.g., greater than about 50 vol. %. In these latter instances, even when the fields have large amounts of stranded gas, processing of the field streams can be economically prohibitive due to the significant equipment and operating expenses associated with the removal of these high levels of $CO_2$ from the valuable $CH_4$ contained in these gas mixtures. Unless otherwise noted, all component concentrations expressed herein are on a water-free basis.

In the processing of natural gas, it is important to remove $CO_2$ from the processed natural gas. Since the $CO_2$ is non-flammable, the $CO_2$ content of the final natural gas product must be reduced to sufficiently low levels to meet the minimum BTU requirements for natural gas shipped by pipeline. In most cases, the $CO_2$ content of the pipelines natural gas stream needs to be less than about 5 vol. %, e.g., less than about 2 vol. %.

A "flue gas" is defined herein as a gas that is emitted from an industrial combustion operation and which is directly or indirectly emitted to the atmosphere (e.g., via a flue, stack, pipe or other channel). Flue gases generally comprise carbon dioxide and water, along with other components such as carbon monoxide (CO), nitrogen, nitrogen oxides ($NO_x$), and uncombusted fuel components.

"Landfill produced gas streams" are defined herein as substantially gas phase streams that are produced from the substantially anaerobic degradation of organic matter in landfill disposal sites. In these landfill decomposition processes, the released gases are captured and processed for the recovery of valuable hydrocarbons which typically contain a significant concentration of methane. "Biogenically produced gas streams" are defined herein as any process that generates a methane-containing product stream from the anaerobic digestion or fermentation of biodegradable organic matter (e.g., manure, sewage, municipal waste, energy crops, etc.).

EXAMPLES

The following illustrative examples are intended to be non-limiting.

Example 1

0.39 g of a 50% NaOH solution, 1.05 g of deionized water and 0.50 g of CBV712 $NH_4$—Y zeolite powder (Zeolyst International, $SiO_2/Al_2O_3$ mole ratio=12) were mixed together in a Teflon liner. The liner was then capped and placed within a Parr steel autoclave reactor. The autoclave was placed in an oven and heated at 125° C. for 5 days. The products were recovered from the cooled reactor, washed with deionized water and dried at 95° C.

Figure 2:
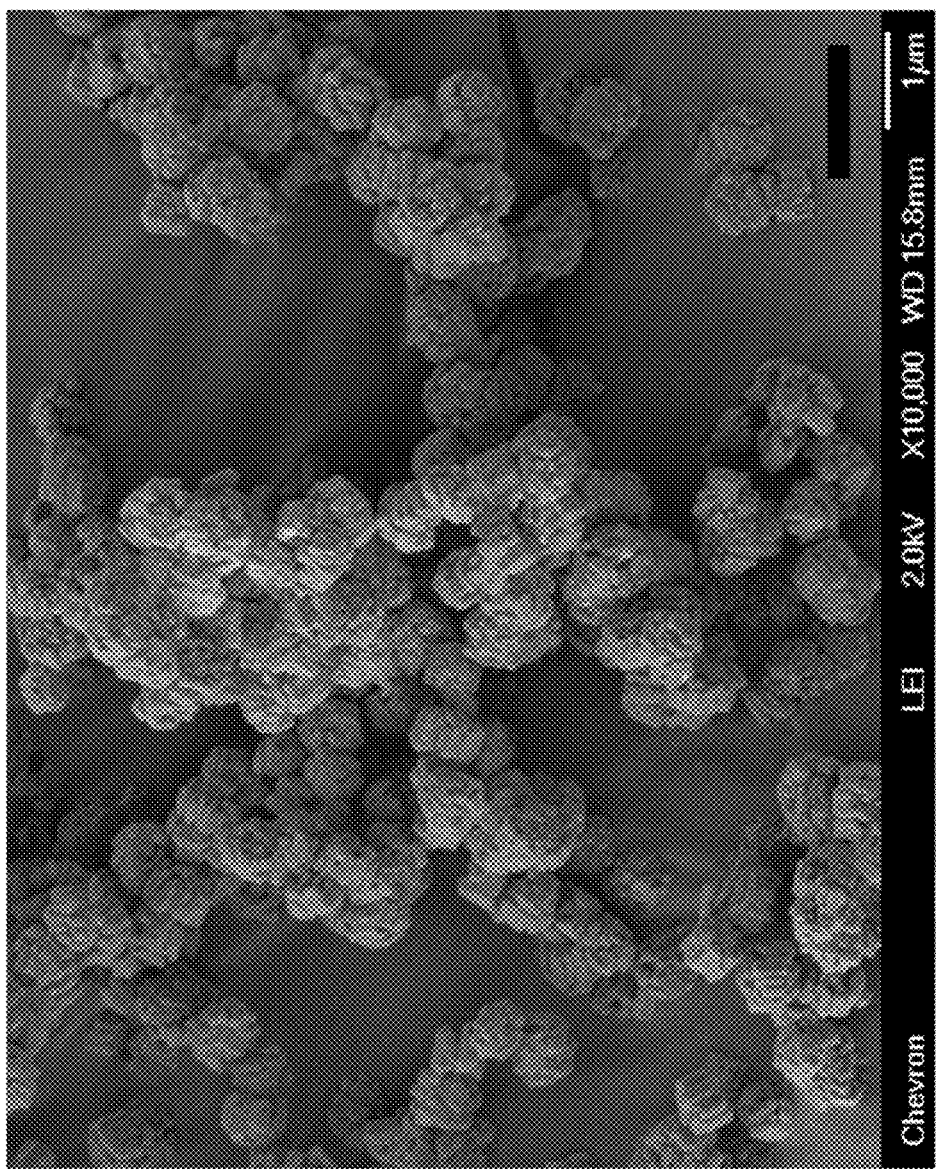
FIG. 2 is a Scanning Electron Micrograph (SEM) image of the zeolite prepared in Example 1.

The resulting as-synthesized product was analyzed by powder XRD and SEM. The powder XRD pattern is shown in FIG. 1 and indicates that the product is a pure phase GME framework type zeolite. FIG. 2 is a SEM image of the product and shows a uniform field of crystals.

The zeolite product had a $SiO_2/Al_2O_3$ mole ratio of 4.6, as determined by ICP elemental analysis.

Example 2

1.87 g of a 50% NaOH solution, 7.50 g of deionized water and 2.00 g of CBV720 H—Y zeolite powder (Zeolyst International, $SiO_2/Al_2O_3$ mole ratio=30) were mixed together in a Teflon liner. The liner was then capped and placed within a Parr steel autoclave reactor. The autoclave was placed in an oven and heated at 125° C. for 4 days. The solid products were recovered from the cooled reactor by centrifugation, washed with deionized water and dried at 95° C.

The resulting product was identified by powder XRD and SEM as a pure phase GME framework type zeolite.

The zeolite product had a $SiO_2/Al_2O_3$ mole ratio of 5.2, as determined by ICP elemental analysis.

Example 3

0.44 g of a 50% NaOH solution, 1.19 g of deionized water and 0.50 g of CBV720 H—Y zeolite powder (Zeolyst International, $SiO_2/Al_2O_3$ mole ratio=30) were mixed together in a Teflon liner. The liner was then capped and placed within a Parr steel autoclave reactor. The autoclave was placed in an oven and heated at 125° C. for 5 days. The solid products were recovered from the cooled reactor by centrifugation, washed with deionized water and dried at 95° C.

The resulting product was identified by powder XRD and SEM as a pure phase GME framework type zeolite.

The zeolite product had a $SiO_2/Al_2O_3$ mole ratio of 5.3, as determined by ICP elemental analysis.

Example 4

0.76 g of a 50% NaOH solution, 1.04 g of deionized water and 1.00 g of CBV720 H—Y zeolite powder (Zeolyst International, $SiO_2/Al_2O_3$ mole ratio=30) were mixed together in a Teflon liner. The liner was then capped and placed within a Parr steel autoclave reactor. The autoclave was placed in an oven and heated at 125° C. for 5 days. The solid products were recovered from the cooled reactor by centrifugation, washed with deionized water and dried at 95° C.

The resulting product was identified by powder XRD and SEM as a pure phase GME framework type zeolite.

The zeolite product had a $SiO_2/Al_2O_3$ mole ratio of 5.2, as determined by ICP elemental analysis.

Example 5

0.38 g of a 50% NaOH solution, 0.52 g of deionized water and 0.50 g of CBV720 H—Y zeolite powder (Zeolyst International, $SiO_2/Al_2O_3$ mole ratio=30) were mixed together in a Teflon liner. The liner was then capped and placed within a Parr steel autoclave reactor. The autoclave was placed in an oven and heated at 125° C. while rotating at 43 rpm for 4 days. The solid products were recovered from the cooled reactor by centrifugation, washed with deionized water and dried at 95° C.

The resulting product was identified by powder XRD and SEM as a pure phase GME framework type zeolite.

The zeolite product had a $SiO_2/Al_2O_3$ mole ratio of 5.4, as determined by ICP elemental analysis.

Examples 6-10

Adsorption/desorption isotherms for $N_2$ and $CO_2$ were obtained in a constant volume isothermal system ($P_{max}$=1 atm, T=273K) for each of the zeolites prepared in Examples 1-5. All zeolites were degassed prior to measurement. The maximum adsorption capacity at equilibrium for $N_2$ and $CO_2$ are set forth in Table 2.

TABLE 2

| Example | Adsorbent | $N_2$ Adsorption Capacity (mmol/g) | $CO_2$ Adsorption Capacity (mmol/g) |
|---|---|---|---|
| Example 6 | Example 1 | 0.09 | 1.46 |
| Example 7 | Example 2 | 0.12 | 2.46 |
| Example 8 | Example 3 | 0.09 | 1.98 |
| Example 9 | Example 4 | 0.08 | 2.25 |
| Example 10 | Example 5 | 0.04 | 1.19 |

From the data indicated in Table 2, it can be deduced that the materials synthesized according to what is specified in Examples 1-5 preferentially adsorb $CO_2$.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. As used herein, the term "comprising" means including elements or steps that are identified following that term, but any such elements or steps are not exhaustive, and an embodiment can include other elements or steps.

Unless otherwise specified, the recitation of a genus of elements, materials or other components, from which an individual component or mixture of components can be selected, is intended to include all possible sub-generic combinations of the listed components and mixtures thereof.

Where permitted, all citations referred to herein are hereby incorporated by reference to the extent such disclosure is not inconsistent herewith.

The invention claimed is:

1. A process for selectively separating carbon dioxide ($CO_2$) from a multi-component gas feedstream comprising $CO_2$ and at least one other gas component, the process comprising:
   (a) contacting the feedstream with an adsorbent comprising an organotemplate-free GME framework type zeolite substantially free of non-GME framework type material, wherein the GME framework type zeolite is non-calcined and has a composition, in the non-calcined and anhydrous state, in terms of mole ratios, as follows:

$x Na_2O:Al_2O_3:y SiO_2$ in which $0<x\leq1$; and y has a value from 3 to 8; and
   wherein the GME framework type zeolite is synthesized by a method comprising the steps of:
      (i) preparing an organotemplate-free reaction mixture containing a FAU framework type zeolite, at least one source of sodium ions, hydroxide ions, and water; and
      (ii) subjecting the reaction mixture to crystallization conditions sufficient to form crystals of the GME framework type zeolite; and
   (b) adsorbing at least a portion of the $CO_2$ in the adsorbent, thereby producing a $CO_2$-lean product gas stream, wherein the $CO_2$-lean product gas stream has a lower concentration of $CO_2$ than the feedstream.

2. The process of claim 1, wherein the process is a pressure swing adsorption process or a temperature swing adsorption process.

3. The process of claim 1, wherein the feedstream is a natural gas, a flue gas or an organically-derived gas stream selected from a landfill produced gas and a biogenically produced gas.

4. The process of claim 1, wherein the feedstream has a $CO_2$ content of at least 10 vol. % and the $CO_2$-lean product stream has a $CO_2$ content of less than 5 vol. %.

5. The process of claim 1, further comprising desorbing at least a portion of the $CO_2$ in the adsorbent, thereby producing a $CO_2$-rich product gas stream, wherein the $CO_2$-rich product gas stream has a higher concentration of $CO_2$ than the feedstream.

6. A process for selectively separating carbon dioxide ($CO_2$) from a multi-component gas feedstream comprising $CO_2$ and at least one other gas component, the process comprising:
   contacting a first side of a membrane comprising an organotemplate-free GME framework type zeolite substantially free of non-GME framework type material to produce a permeate gas mixture on a second side of the membrane and a retentate gas mixture on the first side of the membrane, wherein the permeate gas mixture has a higher concentration of $CO_2$ than the feedstream and the retentate gas mixture has a lower concentration of $CO_2$ than the feedstream,
   wherein the GME framework type zeolite is non-calcined and has a composition, in the non-calcined and anhydrous state, in terms of mole ratios, as follows:

$x Na_2O:Al_2O_3:y SiO_2$ in which $0<x\leq1$; and y has a value from 3 to 8; and
   wherein the GME framework type zeolite is synthesized by a method comprising the steps of:
      (i) preparing an organotemplate-free reaction mixture containing a FAU framework type zeolite, at least one source of sodium ions, hydroxide ions, and water; and
      (ii) subjecting the reaction mixture to crystallization conditions sufficient to form crystals of the GME framework type zeolite.

7. The process of claim 6, wherein the feedstream is a natural gas, a flue gas or an organically-derived gas stream selected from a landfill produced gas and a biogenically produced gas.

8. The process of claim 6, wherein the membrane is a mixed matrix membrane.

* * * * *